(12) United States Patent
Ulrich

(10) Patent No.: US 12,139,005 B2
(45) Date of Patent: Nov. 12, 2024

(54) COMPONENT NODE AND A COMPONENT CARRIER FOR THE COMPONENT NODE

(71) Applicant: MAHLE International GmbH, Stuttgart (DE)

(72) Inventor: Holger Ulrich, Korntal-Muenchingen (DE)

(73) Assignee: MAHLE International GmbH, Stuttgart (DE)

( * ) Notice: Subject to any disclaimer, the term of this patent is extended or adjusted under 35 U.S.C. 154(b) by 438 days.

(21) Appl. No.: 17/578,755

(22) Filed: Jan. 19, 2022

(65) Prior Publication Data
US 2022/0227220 A1 Jul. 21, 2022

(30) Foreign Application Priority Data
Jan. 20, 2021 (DE) ...................... 10 2021 200 500.4

(51) Int. Cl.
| | | |
|---|---|---|
| *B60K 11/02* | (2006.01) | |
| *B60K 1/00* | (2006.01) | |
| *B60K 1/04* | (2019.01) | |

(52) U.S. Cl.
CPC ............... *B60K 11/02* (2013.01); *B60K 1/00* (2013.01); *B60K 1/04* (2013.01); *B60K 2001/003* (2013.01)

(58) Field of Classification Search
CPC . B60K 11/02; B60K 1/00; B60K 1/04; B60K 2001/003; B60K 2001/004; B60K 2001/006
See application file for complete search history.

(56) References Cited

U.S. PATENT DOCUMENTS

| | | | | |
|---|---|---|---|---|
| 8,601,997 B2 * | 12/2013 | Cockerill | ............... | F01M 5/002 123/198 C |
| 10,665,908 B2 | 5/2020 | Krull et al. | | |
| 2020/0116070 A1 * | 4/2020 | Han | ....................... | F02M 26/28 |
| 2021/0061131 A1 * | 3/2021 | Katayama | ............. | B60K 13/04 |
| 2021/0184294 A1 * | 6/2021 | MacKenzie | ............. | B60L 58/26 |

* cited by examiner

*Primary Examiner* — Henry T Crenshaw
*Assistant Examiner* — Kamran Tavakoldavani
(74) *Attorney, Agent, or Firm* — Barnes & Thornburg LLP

(57) ABSTRACT

A component node for a vehicle is provided. The component node has an electric drive motor and an electric energy store. The component node includes at least one function component of a cooling circuit of the vehicle that can be flowed through by cooling liquid and a component carrier. On the component carrier, a component interface or the respective function component is moulded and the respective function component is detachably fastened to the component carrier via the component interface.

15 Claims, 3 Drawing Sheets

COMPONENT NODE AND A COMPONENT CARRIER FOR THE COMPONENT NODE

CROSS REFERENCE TO RELATED APPLICATIONS

This application claims priority to German patent application DE 10 2021 200 500.4, filed Jan. 20, 2021, the entire content of which is incorporated herein by reference.

TECHNICAL FIELD

The disclosure relates to a component node for a vehicle having an electric drive motor and an electric energy store. The vehicle includes at least one function component that can be flowed through by a cooling liquid and a component carrier. The disclosure also relates to the component carrier for the component node.

BACKGROUND

A vehicle having an electric drive motor and an electric energy store can be a purely petri-electrical vehicle or a fuel cell vehicle or a hybrid vehicle. Here, a cooling circuit of the vehicle can comprise multiple function components which can be flowed through by cooling liquid such as coolant and/or refrigerant. However, the challenge is to arrange the individual components in the vehicle in a space-saving manner. From U.S. Ser. No. 10/665,908, it is known for example to fasten the function components to an expansion tank. For this purpose, multiple interfaces are formed on the expansion tank and the function components are fastened to the expansion tank via the interfaces. Because of this, the component node is now formed. Disadvantageously, an expansion tank configured in such a manner constitutes a component that is highly complex and susceptible to failure. When for example the expansion tank is no longer tight, the entire component has to be exchanged. This involves major costs.

SUMMARY

It is an object of the disclosure to provide a component node of the generic type which is improved, or at least an alternative embodiment, with which the described disadvantages are overcome.

The object is achieved by a component node for a vehicle having an electric drive motor and an electric energy store and a component carrier for a component node, as described herein.

A component node is provided for a vehicle having an electric drive motor and an electric energy store. The vehicle can be for example a purely battery-electric vehicle or a hybrid vehicle or a fuel cell vehicle. Here, the component node comprises at least one function component of a cooling circuit of the vehicle that can be flowed through by cooling liquid and a component carrier. The cooling liquid can be coolant and/or refrigerant. Here, a component interface for the respective function component is moulded on the component carrier and the respective function component is detachably fastened to the component carrier via the component interface.

Here, the at least one function component realises an essential or indispensable fluidic function in the cooling circuit such as for example a cooling or a collecting or a condensing of the cooling liquid. The component carrier is not assigned any essential or indispensable fluidic function in the cooling circuit of the vehicle. Because of this, the component carrier is of a robust and trouble-free design. In addition, the at least one function component can be exchanged if required independently of further function components and of the component carrier. Altogether, a space-saving, robust and cost-effective solution is provided by the component node according to the disclosure.

Advantageously, the component carrier can be exclusively designed for carrying the at least one function component. Alternatively, the component carrier can be exclusively designed for carrying the at least one function component and for connecting the at least one function component to the cooling circuit of the vehicle. Here, a fluid line thus does not realise any essential or indispensable function in the cooling circuit since an omission of the same does not cause any change of the fluidic function of the cooling circuit.

Advantageously, the at least one function component can be formed by an expansion tank connected to the cooling circuit for collecting cooling liquid. Advantageously, the at least one function component can be formed by a pump that can be connected into the cooling circuit. Advantageously, the at least one function component can be formed by a chiller that can be connected into the cooling circuit. Advantageously, the at least one function component can be formed by a heat exchanger that can be connected into the cooling circuit. Advantageously, the at least one function component can be formed by a valve that can be connected into the cooling circuit. Advantageously, the at least one function component can be formed by a filter that can be connected into the cooling circuit. Advantageously, the at least one function component can be formed by an indirect condenser that can be connected into the cooling circuit. Advantageously, the at least one function component can also be formed by another component that can be connected into the cooling circuit.

Advantageously, the component node can comprise multiple function components which can be connected into the cooling circuit of the vehicle and flowed through by cooling liquid. Here, a component interface can be formed on the component carrier for each function component, via which the respective function component is releasably fastened to the component carrier. Advantageously, the component interface can be adapted for receiving the at least one function component. In particular, the respective component interface can be adapted in its size and in its shape to the respective function component. Advantageously, the component interface can form the at least one function component in regions. It is conceivable for example that the at least one function component is a heat exchanger and the assigned component interface represents a coil for the heat exchanger in regions. It is also conceivable that the at least one function component is a valve and the associated component interface represents a valve space for the valve in regions.

Advantageously, it can be provided that the at least one function component is directly fluidically connected to a hose or a pipe or a connecting piece and, via the hose or the pipe or the connecting piece, can be connected into the cooling circuit. Advantageously, it can be provided that the component node comprises at least two components. Here, two of these components can be directly fluidically connected to one another via a hose or a pipe or a connecting piece and, via the hose or the pipe or the connecting piece, can be connected into the cooling circuit. Here, one of the function components can be in particular an expansion tank. Advantageously, it can be provided that the component node comprises at least three components. Here, at least two of these components can be directly fluidically connected to the one function component in each case via a hose or a pipe or a connecting piece and, via the hose or the pipe or the connecting piece, can be connected into the cooling circuit. Here, the one function component can be in particular and expansion tank. The term "direct" in this context means that between the two function components no further function components of the cooling circuit that can be connected into the cooling circuit and/or flowed through by cooling liquid are fluidically connected. However, this does not exclude that a secondary component that cannot be connected into the cooling circuit and/or flowed through by cooling liquid, such as for example a temperature sensor or a pressure sensor, can be connected between the two function components.

Advantageously, it can be provided that the at least one function component is formed by an expansion tank for collecting cooling liquid that can be connected into the cooling circuit. Here, the component node can comprise at least one further function component other than the expansion tank, which is directly fluidically connected to the expansion tank.

Advantageously, it can be provided that the component node comprises at least one secondary component which cannot be connected into the cooling circuit and/or not flowed through by cooling liquid. For the respective secondary component, a secondary component interface can be moulded on the component carrier and the respective secondary component can be detachably fastened to the component carrier via the secondary component interface. Advantageously, the at least one secondary component can be a fan or a heater or a control or a temperature sensor or a pressure sensor or a cable or a connector. Advantageously, the component node can also comprise multiple secondary components and, for the respective secondary component, a secondary component interface each can be moulded on the component carrier.

Advantageously, it can be provided that in the component carrier at least one fluid line that can be flowed through by cooling liquid having connecting points formed on both sides is formed. In other words, the fluidic connection of the at least one function component to the cooling circuit can be at least partially realised by the fluid line in the component carrier. Here, the at least one function component can be directly or, however, indirectly fluidically connected to a connecting point via a hose or a pipe or a connecting piece.

Advantageously, the at least one function component can be directly fluidically connected to the at least one fluid line and, via the at least one fluid line, can be connected into the cooling circuit. Advantageously, the component node can comprise at least two function components, wherein two of these function components are directly fluidically connected to one another via the at least one fluid line. Here, one of the function components can be in particular an expansion tank. Advantageously, the component node can comprise at least three function components and in the component carrier at least two fluid lines can be formed. At least two of the function components can be directly fluidically connected to the one function component via the fluid lines and, via the fluid lines, can be connected into the cooling circuit. Here, the one function component can be in particular an expansion tank.

Advantageously, it can be provided that on the component carrier a fastening interface for fastening the component carrier and by way of this the component node to a bodywork of the vehicle is moulded. The component carrier can then be fastened to the bodywork of the vehicle and carry the at least one function component. Practically, the component carrier is formed out of a material which under the weight of the at least one function component is not deformed. Typically, the component carrier is moulded from plastic.

Advantageously, it can be provided that the component carrier is formed out of multiple individual parts. The individual parts can be integrally bonded, typically welded and/or glued and/or positively connected, typically screwed and/or non-positively connected, typically clipped together. Because of this, complex shapes of the component carrier can also be realised.

In an exemplary embodiment of the component node it can be provided that the component node comprises at least one valve that can be connected into the cooling circuit. The valve is then installed into the component carrier of the component node. Here, the at least one valve can be completely surrounded by the component carrier towards the outside. The at least one valve can be arranged for example in a hollow space formed within the component carrier and be completely surrounded by the component carrier towards the outside. The at least one valve can comprise a valve housing, wherein the component carrier completely represents the valve housing for the at least one valve and/or the valve housing is represented by a wall forming the component carrier. Advantageously, inlets leading into the valve and/or out of the valve can also be represented by the component carrier or the wall of the component carrier.

Here, the at least one valve can be directly fluidically connected to at least one function component. In particular, the at least one valve can be fluidically connected to the at least one function component via a fluid line that can be flowed through by cooling liquid. Here, the fluid line can be entirely formed in the component node. Alternatively or additionally, the at least one valve can be fluidically connected to the at least one function component by a hose or a pipe or a connecting piece.

The disclosure also relates to the component carrier for the component node described above. Here, the component carrier comprises at least one component interface for the detachable fastening of at least one function component of a cooling circuit of a vehicle having an electric drive motor and an electric energy store. The vehicle can be for example a purely battery-electrical vehicle or a fuel cell vehicle or a hybrid vehicle. Advantageously, the component carrier can be exclusively designed for carrying the at least one function component. Alternatively, the component carrier can be exclusively designed for carrying the at least one function component and for connecting the at least one function component into the cooling circuit of the vehicle. In order to avoid repetitions reference is made here to the above explanations.

Further important features and advantages of the disclosure are obtained from the drawings and from the associated figure description by way of the drawings.

It is to be understood that the features mentioned above and still to be explained in the following cannot only be used in the respective combinations stated, but also in other combinations or by themselves without leaving the scope of the present disclosure.

Exemplary embodiments of the disclosure are shown in the drawings and are explained in more detail in the following description, wherein same reference numbers relate to same or similar or functionally same components.

BRIEF DESCRIPTION OF THE DRAWINGS

The disclosure will now be described with reference to the drawings wherein.

DESCRIPTION OF EXEMPLARY EMBODIMENTS

Figure 1:
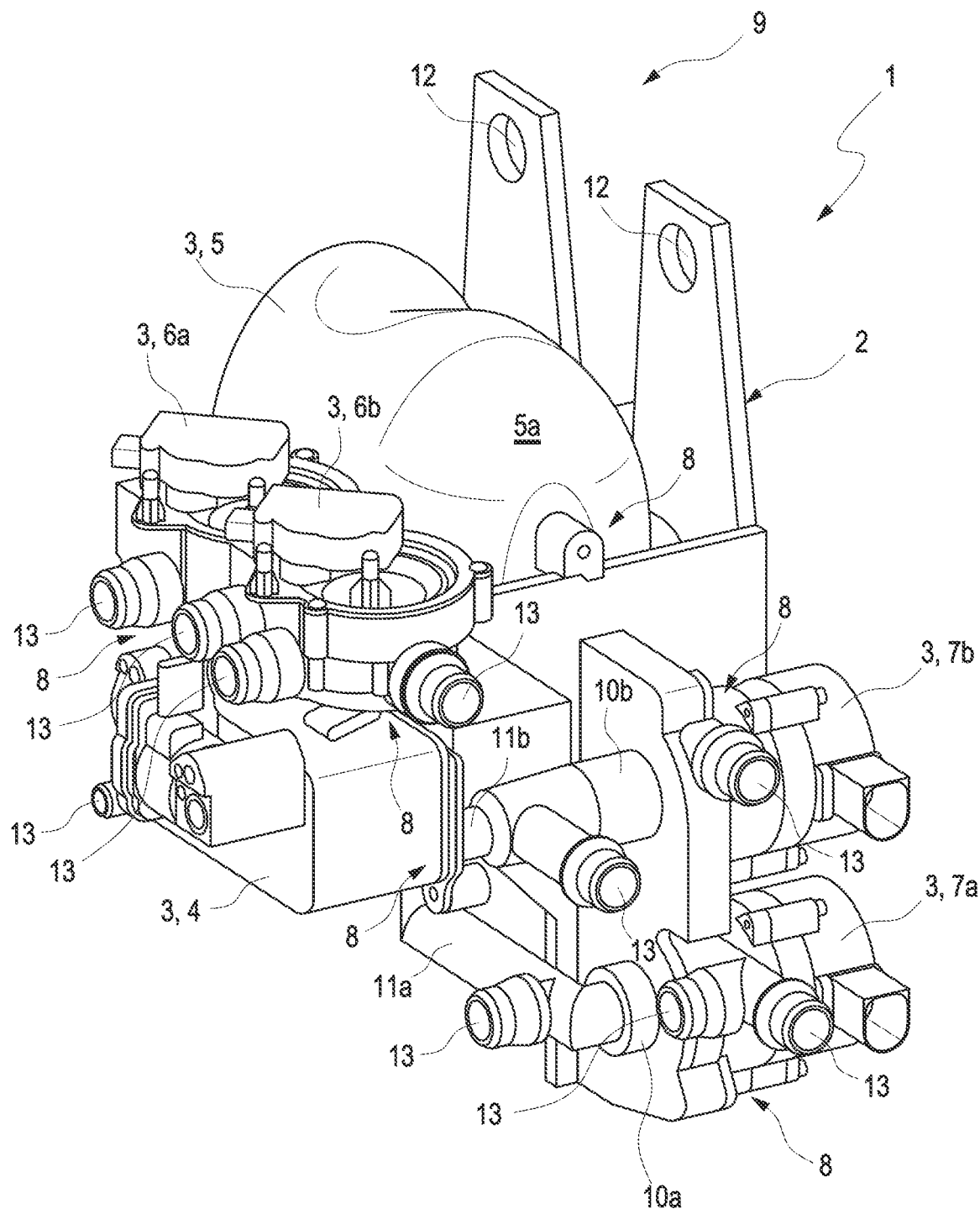
FIGS. 1 to 3 show different views of a component node according to an exemplary embodiment of the disclosure.
Figure 2:
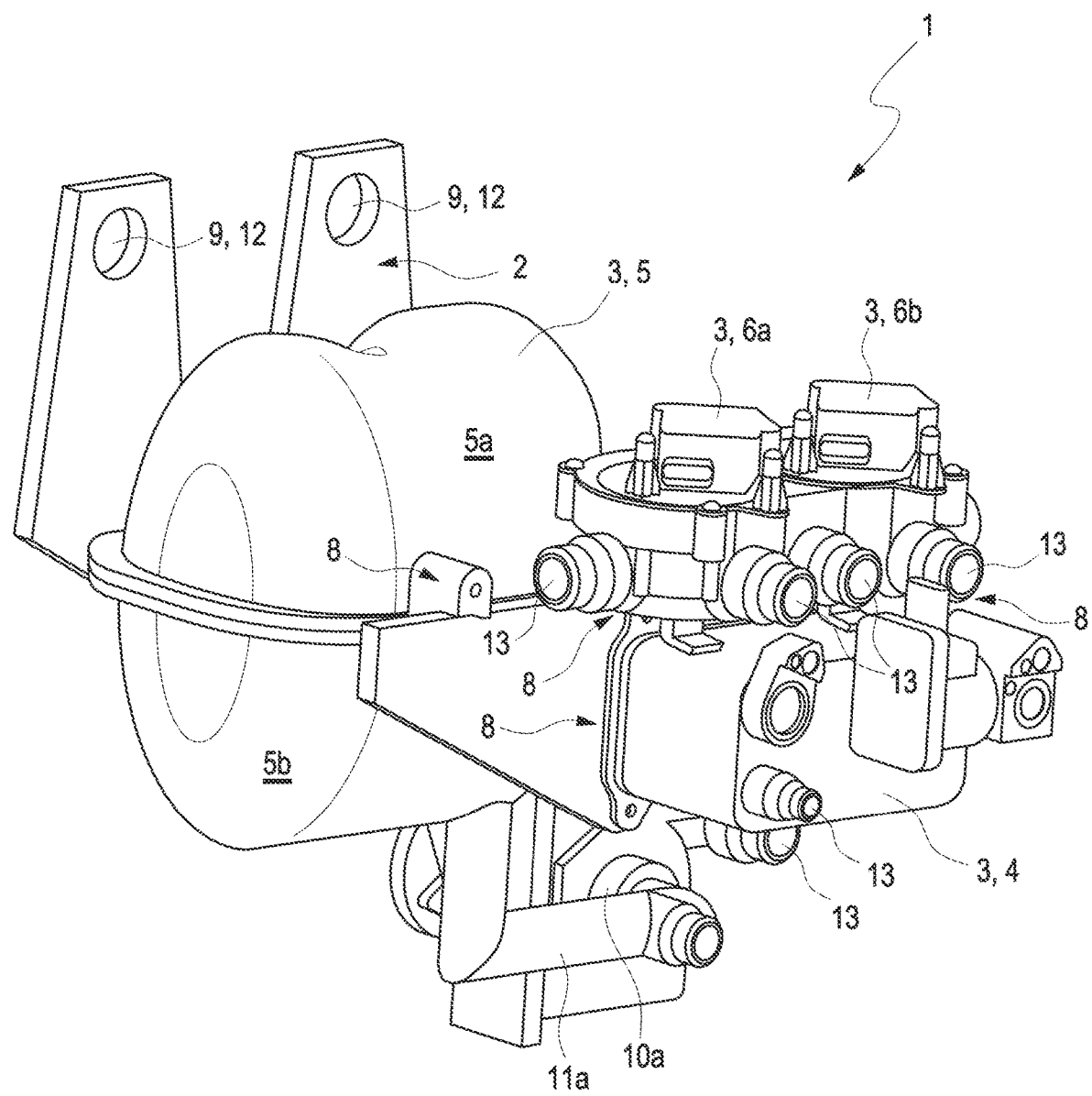
Figure 3:
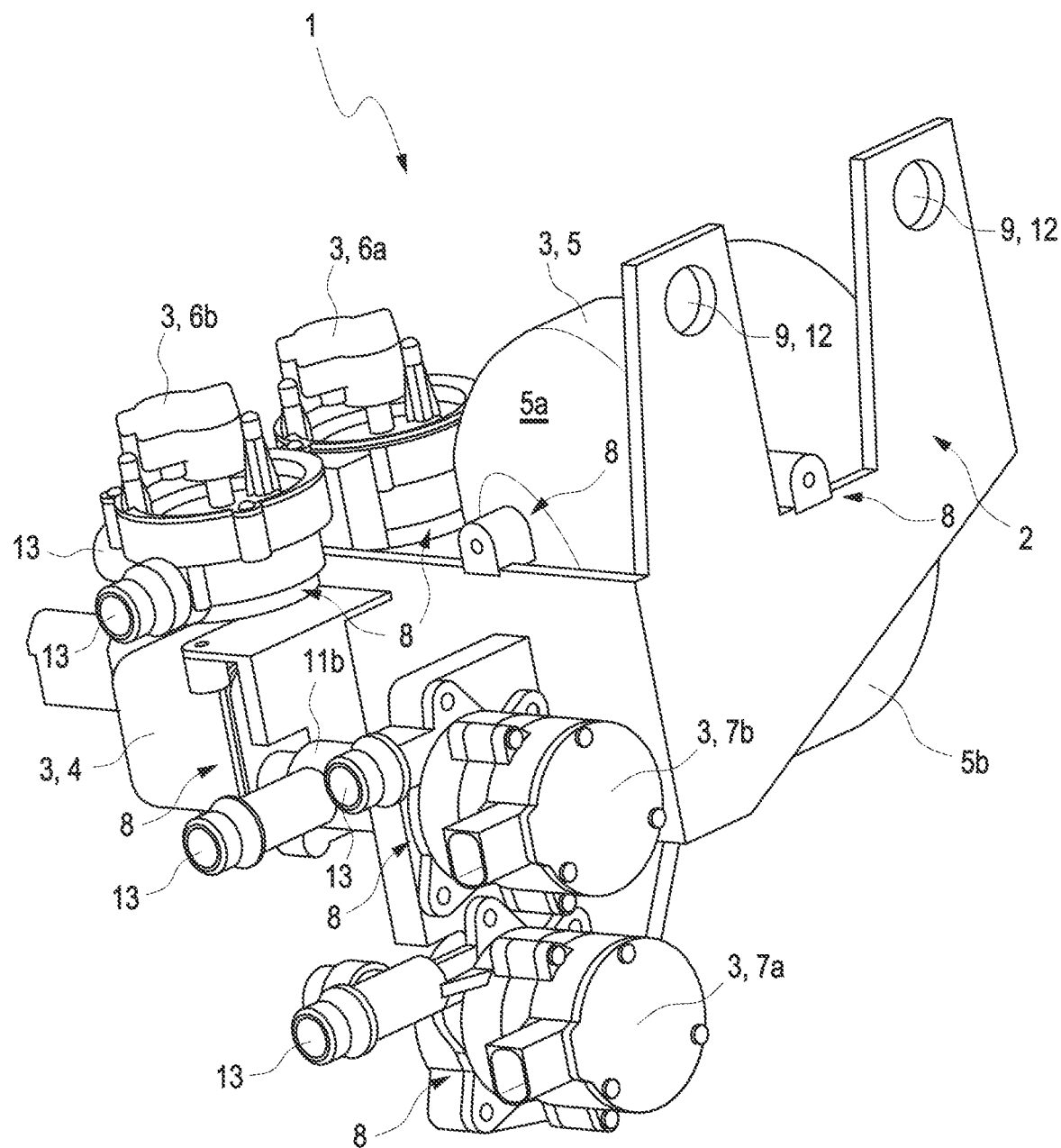

FIGS. 1 to 3 show different views of a component node 1 according to an exemplary embodiment of the disclosure for a vehicle having an electric drive motor and an electric energy store. The vehicle can be for example a purely battery-electric vehicle or a fuel cell vehicle or a hybrid vehicle. Here, the component node 1 comprises a component carrier 2 and multiple function components 3. In this exemplary embodiment, the multiple function components 3 are a chiller 4, an expansion tank 5, two valves 6a and 6b and two pumps 7a and 7b. The function components 3 of the component node 1 and, if applicable, further components are fluidically connected to one another in a cooling circuit. In FIG. 1, the component node 1 is shown with view of the chiller 4; in FIG. 2 the component node 1 is shown with view of the expansion tank 5; and in FIG. 3 the component node 1 is shown with view of the pumps 7a and 7b. With reference to FIG. 2, the expansion tank 5 is formed of two tank halves 5a and 5b, which are flanged together in a fluid-tight manner.

The component carrier 2 is designed for carrying the function components 3 and comprises a component interface 8 each for the respective function component 3. Here, the respective component interface 8 is adapted to the shape and the size and the function of the respective function component 3. The individual component interfaces 8 thus differ from one another. The respective function component 3 is then detachably fastened to the component carrier 2 by way of the respective component interface 8. In addition, a fastening interface 9 is moulded onto the component carrier 2 via which the component carrier 2 and because of this the component node 1 can be fixed to a bodywork of the vehicle. The fastening interface 9 in this exemplary embodiment is formed by two openings 12a and 12b.

In addition, the component carrier 2 is designed for connecting at least some of the function components 3 to the cooling circuit of the vehicle. For this purpose, two fluid lines 10a and 10b are moulded in the component carrier 2. By way of the one fluid line 10a and a pipe 11a, the pump 7a is fluidically connected to the expansion tank 5. By way of the fluid line 10b and a pipe 11b the pump 7 is fluidically connected to a chiller 4. Otherwise, the pumps 7a and 7b, the pumps 11a and 11b, the valves 6a and 6b comprise multiple connectors 13, which are provided for connecting the function components 3 of the component node 1 to one another and to further components of the cooling circuit. For this purpose, hoses or pipes or connecting pieces can be used for example.

As is noticeable in FIGS. 1 to 3, the component carrier 2 is of a robust and trouble-free design. If required, the function components 3 can be exchanged individually and independently of one another. Altogether, the component node 1 is of a space-saving, robust and cost-effective design.

It is understood that the foregoing description is that of the exemplary embodiments of the disclosure and that various changes and modifications may be made thereto without departing from the spirit and scope of the disclosure as defined in the appended claims.

What is claimed is:

1. A configurable component node for a vehicle having an electric drive motor and an electric energy store, the configurable component node comprising:

at least one function component of a cooling circuit of the vehicle through which cooling liquid can flow; and a component carrier, wherein on the component carrier a component interface for the respective function component is moulded and the respective function component is detachably fastened to the component carrier via the component interface, and wherein the configurable component node comprises interchangeable receptacles configured to interface with different component carriers via in-line valves.

2. The configurable component node according to claim 1, wherein:

the component carrier is exclusively designed for carrying the at least one function component, or the component carrier is exclusively designed for carrying the at least one function component and for connecting the at least one function component to the cooling circuit of the vehicle.

3. The configurable component node according to claim 1, wherein:

the at least one function component is formed by an expansion tank that can be connected into the cooling circuit for collecting cooling liquid, and/or the at least one function component is formed by a pump that can be connected into the cooling circuit, and/or the at least one function component is formed by a chiller that can be connected into the cooling circuit, and/or the at least one function component is formed by a heat exchanger that can be connected into the cooling circuit, and/or the at least one function component is formed by a valve that can be connected into the cooling circuit, and/or the at least one function component is formed by a filter that can be connected into the cooling circuit, and/or the at least one function component is formed by an indirect condenser that can be connected into the cooling circuit.

4. The configurable component node according to claim 1, wherein:

the component interface is adapted for receiving the at least one function component, and/or the component interface forms the at least one function component in the regions.

5. The configurable component node according to claim 1, wherein:

the at least on function component is directly fluidically connected to a hose or a pipe or a connecting piece and, via the hose or the pipe or the connecting piece, can be connected into the cooling circuit, and/or the configurable component node comprises at least two function components, wherein two of these function components are directly fluidically connected to one another via a hose or a pipe or a connecting piece and, via the hose or the pipe or the connecting piece, can be connected into the cooling circuit, and/or the configurable component node comprises at least three function components wherein at least two of these function components are directly fluidically connected to the one function component in each case via a hose or a pipe or a connecting piece and, via the hose or the pipe or the connecting piece, can be connected into the cooling circuit.

6. The configurable component node according to claim 1, wherein:

the at least one function component is formed by an expansion tank that can be connected into the cooling circuit for collecting cooling liquid, and the configurable component node comprises at least one function component other than the expansion tank, which is directly fluidically connected to the expansion tank.

7. The configurable component node according to claim 1, wherein:

the configurable component node comprises at least one secondary component that cannot be connected into the cooling circuit, on the component carrier, a secondary component interface for the respective secondary component is moulded, and the respective secondary component is detachably fastened to the component carrier via the secondary component interface.

8. The configurable component node according to claim 1, wherein:

the component carrier comprises at least one fluid line, and wherein the component carrier has a first connecting point at a first end and a second connecting point at a second end.

9. The configurable component node according to claim 8, wherein:

the at least one function component is directly fluidically connected to the at least one fluid line and, via the at least one fluid line can be connected into the cooling circuit, and/or the configurable component node comprises at least two function components, wherein two of these function components are directly fluidically connected to one another via the at least one fluid line and, via the at least one fluid line, can be connected into the cooling circuit, and/or the configurable component node comprises at least three function components and in the component carrier at least two fluid lines are formed, wherein at least two of these function components are directly fluidically connected to the one function component via the fluid lines and, via the fluid lines, can be connected into the cooling circuit.

10. The configurable component node according to claim 1, wherein on the component carrier, a fastening interface for fastening the component carrier and because of this the configurable component node is moulded on a bodywork of the vehicle.

11. The configurable component node according to claim 1, wherein the component carrier is formed out of multiple individual parts which are connected to one another in an integrally bonded manner, typically welded and/or glued, and/or positively connected to one another, typically screwed and/or clipped together.

12. The configurable component node according to claim 1, wherein the configurable component node comprises at least one valve that can be connected into the cooling circuit, and the valve is installed in the component carrier of the configurable component node.

13. The configurable component node according to claim 12, wherein:

the at least one valve is completely surrounded by the component carrier towards the outside, and/or the at least one valve is arranged in a hollow space formed within the component carrier and surrounded by the component carrier towards the outside, and/or the at least one valve comprises a valve housing, wherein the component carrier completely represents the valve housing for the at least one valve; and/or the at least one valve comprises a valve housing, wherein the valve housing is formed by a wall forming the component carrier.

14. The configurable component node according to claim 12, wherein the at least one valve is fluidically connected to at least one function component.

15. The component carrier for the configurable component node according to claim 1, the component carrier comprising:

at least one component interface for fastening at least one functioning component of the cooling circuit of the vehicle having the electric drive motor and the electric energy store.

* * * * *